United States Patent
Shin et al.

(10) Patent No.: US 8,400,403 B2
(45) Date of Patent: Mar. 19, 2013

(54) KEY INPUT METHOD AND APPARATUS FOR PORTABLE APPARATUS

(75) Inventors: Young-Shik Shin, Suwon-si (KR); Kwang-Cheol Choi, Seoul (KR); Chang-Seok Lee, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 12/657,067

(22) Filed: Jan. 13, 2010

(65) Prior Publication Data

US 2010/0177046 A1      Jul. 15, 2010

(30) Foreign Application Priority Data

Jan. 14, 2009  (KR) .................. 10-2009-0002896

(51) Int. Cl.
   *G09G 5/00* (2006.01)
(52) U.S. Cl. .................... 345/169; 345/168
(58) Field of Classification Search ........... 345/156–169
   See application file for complete search history.

(56) References Cited

U.S. PATENT DOCUMENTS

| | | | |
|---|---|---|---|
| 6,888,536 B2 * | 5/2005 | Westerman et al. | 345/173 |
| 7,339,580 B2 * | 3/2008 | Westerman et al. | 345/173 |
| 2002/0015024 A1 | 2/2002 | Westerman et al. | |
| 2007/0109278 A1 | 5/2007 | Moon | |

FOREIGN PATENT DOCUMENTS

| | | |
|---|---|---|
| JP | 11119912 A | 4/1999 |
| KR | 1020070050711 A | 5/2007 |
| KR | 1020070090290 A | 9/2007 |
| KR | 1020080096593 A | 10/2008 |

OTHER PUBLICATIONS

International Search Report dated Sep. 27, 2010 in connection with International Patent Application No. PCT/KR2010/000210.

* cited by examiner

*Primary Examiner* — Vijay Shankar

(57) ABSTRACT

A key input apparatus for a portable apparatus includes a display unit that displays a key selected by a user input. The apparatus includes a light sensor comprising a plurality of light emitting elements and a plurality of light receiving elements. The respective light emitting elements generate first light signals upward at a predetermined angle from a direction in which the light emitting elements face the light receiving elements. The apparatus also includes input detection unit that detects the light receiving elements that receive the first light signals, and detects a user's space input position using the light receiving elements that receive the first light signals if the light receiving elements that receive the first light signals are detected.

20 Claims, 8 Drawing Sheets

KEY INPUT METHOD AND APPARATUS FOR PORTABLE APPARATUS

CROSS-REFERENCE TO RELATED APPLICATION(S) AND CLAIM OF PRIORITY

The present application is related to and claims the priority under 35 U.S.C. §119(a) of an application entitled "Key Input Method And Apparatus For Portable Apparatus" filed in the Korean Industrial Property Office on Jan. 14, 2009 and assigned Serial No. 10-2009-0002896, the contents of which are hereby incorporated by reference.

TECHNICAL FIELD OF THE INVENTION

The present invention relates to key input for a portable apparatus, and more particularly to a key input method and apparatus using a light sensor.

BACKGROUND OF THE INVENTION

In general, portable apparatuses may be portable electronic devices that include apparatuses that can provide a communication function capable of calling or exchanging data as they move, such as a cellular phone, a PDA (Personal Digital Assistant), a PCS (Personal Communication Services phone), an IMT (International Mobile Telecommunication)-2000 terminal, a GSM (Global System for Mobile Communication) terminal, and the like, and devices for content playback, such a PMP (Portable Multimedia Player), an MP3 (MPEG audio layer-3) player, and the like.

Recently, in such portable apparatuses, not only the existing mechanical key input unit but also a touch screen for simultaneous input/output functions has been mainly used.

Since the touch screen can serve as a key input unit, provide a relatively large screen, and have a simple and slim design, it has been applied to a portable apparatus in diverse manners.

Alternatively, a graphical user interface that is used in the recent portable apparatus' has evolved into a three-dimensional (3D) user interface using a touch screen, further diversifying the existing form.

Also, a three-dimensional stereophonic display that enables a user to recognize an image displayed on a display screen in three dimensions has been continuously researched.

SUMMARY OF THE INVENTION

To address the above-discussed deficiencies of the prior art, it is a primary object to provide a key input method and apparatus that can provide a convenient user interface using a light sensor in a portable apparatus.

In accordance with an aspect of the present invention, there is provided a key input apparatus for a portable apparatus, which includes a display unit that displays a key selected by a user input; a light sensor that includes a plurality of light emitting elements mounted at predetermined intervals on the border of one side of the display unit and a plurality of light receiving elements mounted on the border of the other side of the display unit to face the light emitting elements, respectively, wherein the respective light emitting elements generate first light signals upward at a predetermined angle from a direction in which the light emitting elements face the light receiving elements, respectively, and outputting light signal transmission/reception information of the light emitting elements and the light receiving elements; and an input detection unit that receives the light signal transmission/reception information from the light sensor, detects the light receiving elements that receive the first light signals using the light signal transmission/reception information, and detects a user's space input position using the light receiving elements that receive the first light signals if the light receiving elements that receive the first light signals are detected.

In accordance with another aspect of the present invention, there is provided a key input method for a portable apparatus, including: by a display unit that includes a plurality of light emitting elements mounted at predetermined intervals on the border of one side of the display unit and a plurality of light receiving elements mounted on the border of the other side of the display unit to face the light emitting elements, respectively, generating first light signals upward at a predetermined angle from a direction in which the light emitting elements face the light receiving elements, respectively; detecting the light receiving elements that receive the first light signals; and if the light receiving elements that receive the first light signals are detected, detecting a user's space input position using the light receiving elements that receive the first light signals.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
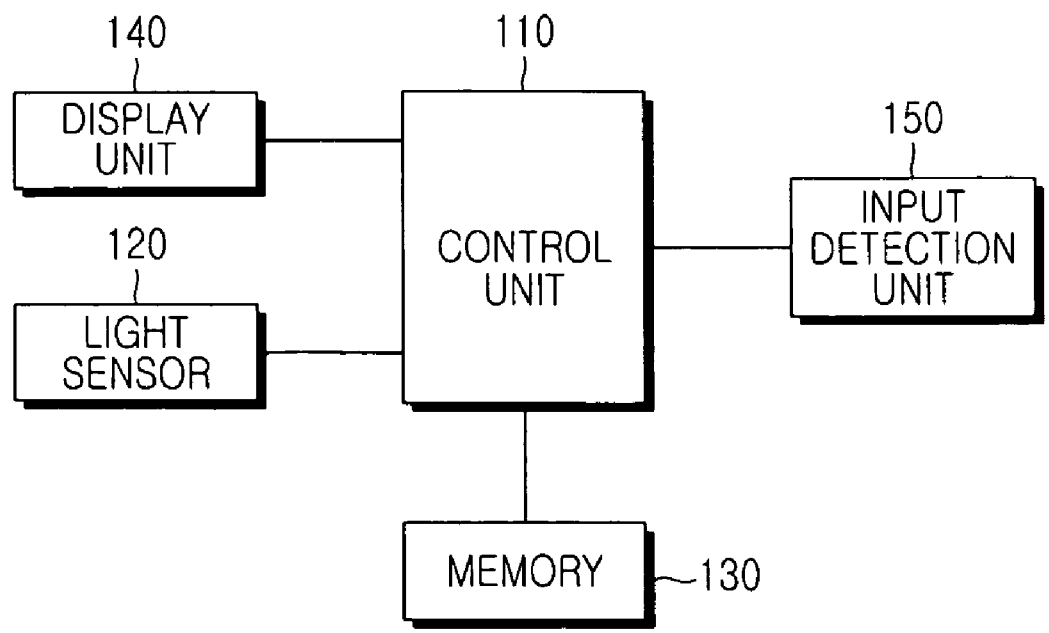
FIG. 1 illustrates the configuration of a key input apparatus for a portable apparatus according to an embodiment of the present invention.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal. In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

FIG. 1 illustrates the configuration of a key input apparatus for a portable apparatus according to an embodiment of the present invention.

Referring to FIG. 1, the key input apparatus for a portable apparatus according to an embodiment of the present invention includes a light sensor 120, a memory 130, a display unit 140, an input detection unit 50, and a control unit 110.

The display unit 140 displays various kinds of image information. In an embodiment of the present invention, the display unit 140 enlarges and displays a key selected in accordance with user's space or touch input. In another embodiment of the present invention, the display unit 140 is implemented by a touch screen. Also, in the case in which the display unit 140 is a three-dimensional (3D) stereophonic display, the display unit enlarges the key selected by the user into a 3D image to stereoscopically display the key.

The memory 130 stores information required for the operation of the key input apparatus.

Figure 2:
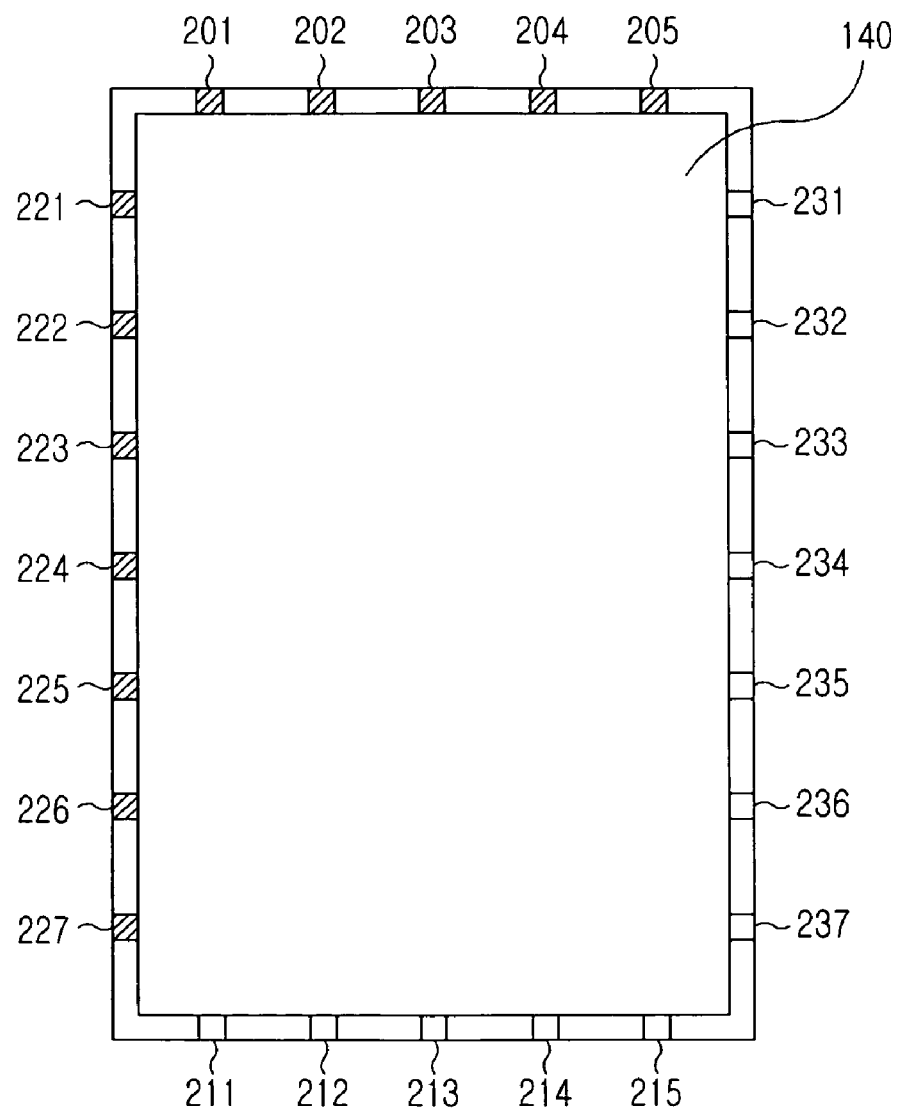
FIG. 2 illustrates an example view showing light emitting elements and light receiving elements mounted on a display unit in a key input apparatus for a portable apparatus according to an embodiment of the present invention.

The light sensor 120 is composed of a plurality of light emitting elements and light receiving elements, which are mounted at predetermined intervals on the borders of the display unit 140 to detect a user's input generated in the display unit 140. The light sensor 120 will now be described in detail with reference to FIG. 2. FIG. 2 is an exemplary view showing light emitting elements and light receiving elements mounted on a display unit in a key input apparatus for a portable apparatus according to an embodiment of the present invention. As illustrated in FIG. 2, the light emitting elements 201 to 205 and 221 to 227 are installed at predetermined intervals on left and upper sides of the border of the display unit 140, and the light receiving elements 211 to 215 and 231 to 237 are installed on right and lower sides of the border of the display unit 140 to face the light emitting elements in a one-to-one manner to receive light signals generated from the light emitting elements 201 to 205 and 221 to 227. That is, the light signal generated from the light emitting element 201 is incident to the light receiving element 211, and the light signal generated from the light emitting element 221 is incident to the light receiving element 231. Alternatively, the number and the installation positions of the light emitting elements and the light receiving elements of the light sensor as illustrated in FIG. 2 are not limited to those as illustrated in FIG. 2, but may be variously modified under the existing conditions.

The light sensor 120 transfers light signal transmission/reception information of the light emitting elements and the light receiving elements to the control unit 110. Alternatively, the light sensor 120 transfers information about the reception/non-reception of the light signals in the light receiving elements 211 to 215 and 231 to 237 to the control unit 110, and also transfers at least one of information about the quantity of light transmitted from the light emitting elements 201 to 205 and 221 to 227 and information about the change of light quantity to the input detection unit 150.

The input detection unit 150 detects the user input using information about whether the respective light receiving elements 211 to 215 and 231 to 237 have received the light signals transferred from the light sensor 120, received and transmitted quantities of light, or the degree of change of the light quantities.

The input detection unit 150, in the case of detecting the user's space input, detects all the light receiving elements that receive both first light signals and second light signals among the light receiving elements mounted on the right side and the light receiving elements mounted on the lower side of the display unit, respectively. In this case, the user input position can be detected using the vertical positions of the light receiving elements that receive both the first light signals and the second light signals among the light receiving elements mounted on the right side and the horizontal positions of the light receiving elements that receive both the first light signals and the second light signals among the light receiving elements mounted on the lower side. In the same manner, the user input position can be detected in the case of detecting the user touch input.

The control unit 10 controls the whole operation of the key input apparatus, and controls the respective constituent elements. In an embodiment of the present invention, the control unit 110 controls the light emitting elements of the display unit 140 to generate first light signals upward as a predetermined angle from a direction in which the light emitting elements face the corresponding light receiving elements, respectively. In addition, the control unit 110 controls the input detection unit 150 to detect the light receiving elements that receive the first light signals and to detect a user's space input position using the light receiving elements that receive the first light signals if the light receiving elements that receive the first light signals are detected. Then, the control unit 110 controls the display unit 140 to display a key corresponding to the detected space input position. In this case, if the display unit 140 is a three-dimensional (3D) stereoscopic display, the control unit 110 controls the display unit 140 to enlarge and display in three dimensions the key corresponding to the detected space input position. The angle at which the first light signals are generated is set so that a user's finger or an input tool, such as a touch pen, can detect the space input state that is a state in which the user's finger or the input tool is put in a space over the display unit without being in direct contact with the display unit.

Also, in an embodiment of the present invention, the control unit 110 controls the respective light emitting elements to generate second light signals along surfaces of the display unit to the light receiving elements that correspond to the light emitting elements, respectively. In addition, the control unit 110 controls the input detection unit 150 to detect the light receiving elements that do not receive the second light signals and to detect a user's touch input position using the light receiving elements that do not receive the second light signals if the light receiving elements that do not receive the second light signals.

In another embodiment of the present invention, the display unit 140 includes a touch screen, and the user's touch input position is detected using the touch screen.

Figure 3A:
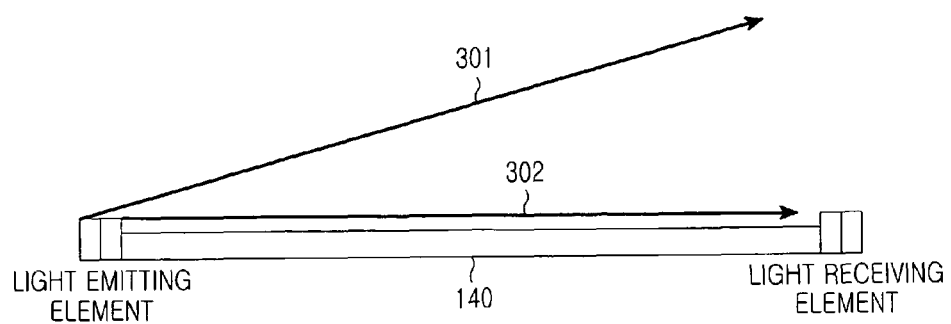
FIGS. 3A through 3C illustrate views showing input modes during the key input operation of a portable apparatus according to an embodiment of the present invention.
Figure 3B:
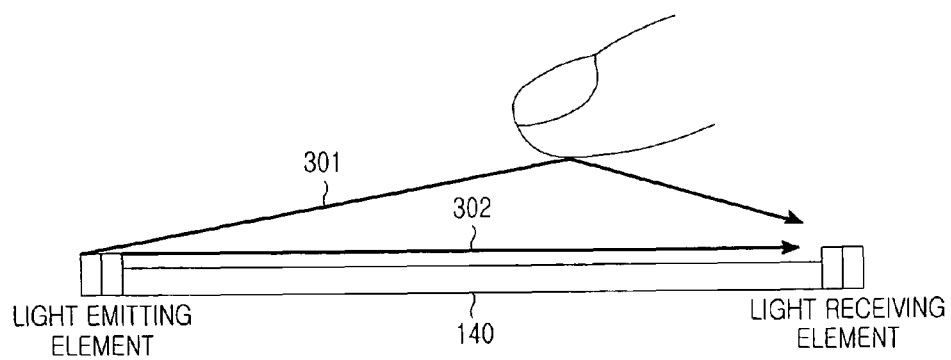
Figure 3C:
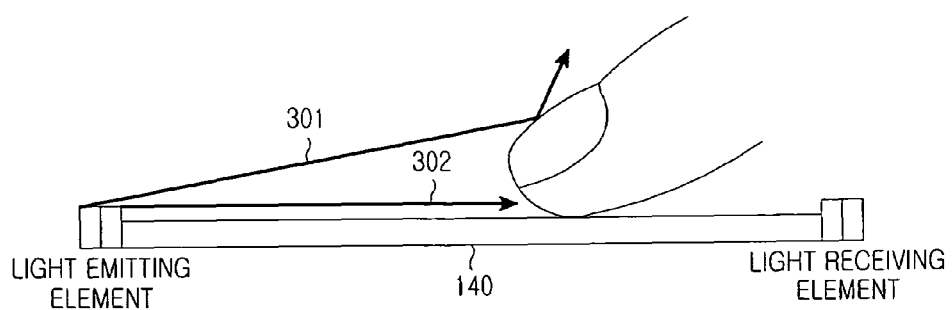

FIGS. 3A through 3C are views showing input modes during the key input operation of a portable apparatus according to an embodiment of the present invention. Referring to FIGS. 3A through 3C, in an embodiment of the present invention, the light emitting elements 201 to 205 and 221 to 227 generate first light signals 301 for detecting the user's space input and second light signals 302 for detecting the user's touch input. The first light signals 301 and the second light signals 302 may be discriminated from each other through assignment of the light emitting elements and the light receiving elements having different frequencies.

The respective light emitting elements 201 to 205 and 221 to 227 generate the second light signals to the light receiving elements 211 to 215 and 231 to 237 corresponding to the light emitting elements 201 to 205 and 221 to 227, respectively, along the surfaces of the display unit 140, and generate the first light signals upward, i.e., in a vertical direction, from the second light signals. That is, the light emitting elements generate the first light signals upward at a predetermined angle from the surfaces of the display unit.

FIG. 3A shows a state in which no input is generated on the display unit. In this case, the first light signals 301 are generated in an upward direction of the display unit, and thus they are not detected by the light receiving elements 211 to 215 and 231 to 237. At the same time, the second light signals 302 are generated directly toward the light receiving elements 211 to 215 and 231 to 237, and thus they are received by the light receiving elements 211 to 215 and 231 to 237.

FIG. 3C shows a state in which a user's touch input is generated on the display unit. In this case, as shown in FIG. 3C, the light receiving elements 211 to 215 and 231 to 237 receive neither the first light signals 301 nor the second light signals 302.

In FIG. 3B, the second light signals 302, directly input to the light receiving elements 211 to 215 and 231 to 237, and the first light signals 301, reflected by the user's finger and then input to the light receiving elements, can be discriminated through measurement of the change of the sensitivity and the wavelength of light input to the light receiving elements.

During the key input operation according to an embodiment of the present invention, whether the light receiving elements have received the light signals in respective input modes is described in Table 1 below.

TABLE 1

| Input Mode | First Light Signal Input Sensor 1 (Frequency f1) | Second Light Signal Input Sensor 2 (Frequency f2) |
| --- | --- | --- |
| No Input | X (no sensing) | ○ (sensing) |
| Space Input | ○ | ○ |
| Touch Input | X | X |

Figure 4A:
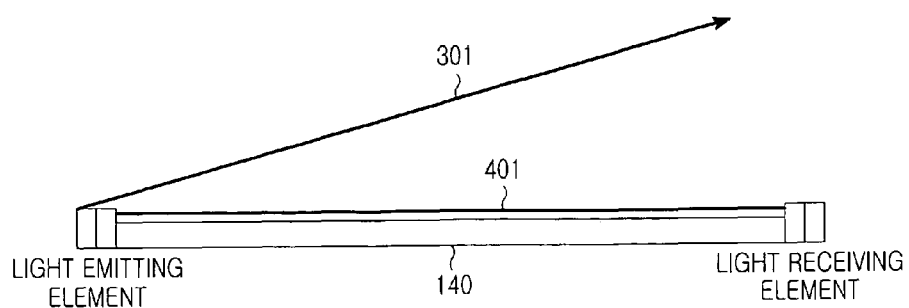
FIGS. 4A through 4C illustrate views showing input modes during the key input operation of a portable apparatus according to another embodiment of the present invention.
Figure 4B:
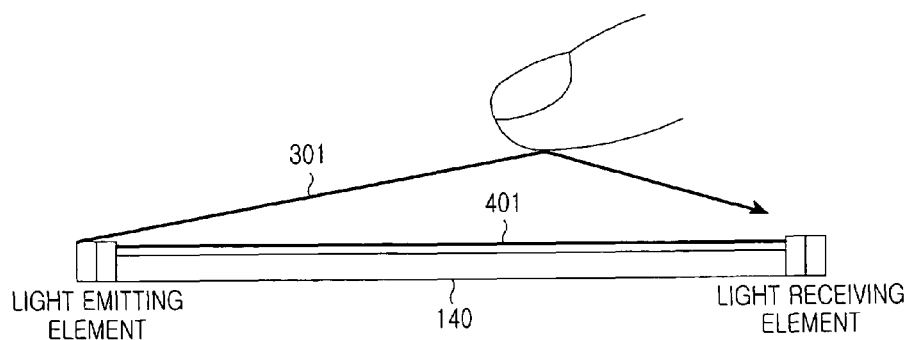
Figure 4C:
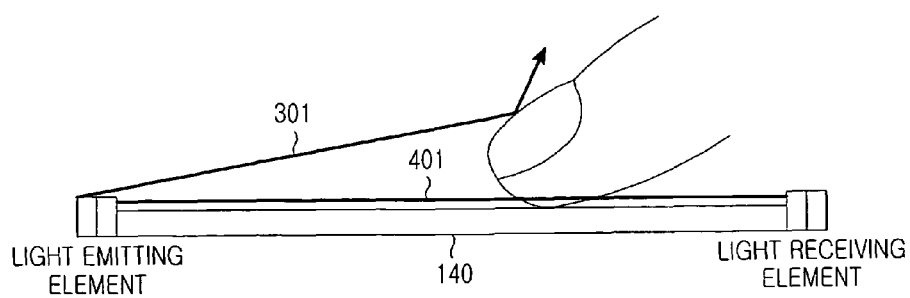

FIGS. 4A through 4C are views showing input modes during the key input operation of a portable apparatus according to another embodiment of the present invention. In another embodiment of the present invention, the second light signals 302 are not used, but a touch screen 401 for detecting user's touch input is used.

FIG. 4A shows a state in which no input is generated on the display unit. In this case, the first light signals 301 are generated in an upward direction of the display unit, and thus are not detected by the light receiving elements 211 to 215 and 231 to 237. At the same time, no input is detected by the touch screen 401.

FIG. 4B shows a state in which user's space input is generated on the display unit. In this case, the first light signals 301 are reflected by a user's finger or an input tool, such as a touch pen, and thus are received in the light receiving elements 211 to 215 and 231 to 237. At the same time, no input is detected by the touch screen 401.

FIG. 4C shows a state in which user's touch input is generated on the display unit. In this case, the first light signals 301 are not received in the light receiving elements 211 to 215 and 231 to 237. At the same time, the user's touch input is detected through the touch screen 401.

During the key input operation according to another embodiment of the present invention, whether the light receiving elements have received the light signals in respective input modes is described in Table 2 below.

TABLE 2

| Input Mode | Light Sensor | Touch Screen |
| --- | --- | --- |
| No Input | X (no sensing) | ○ (no sensing) |
| Space Input | ○ | ○ |
| Touch Input | X | ○ |

Figure 5A:
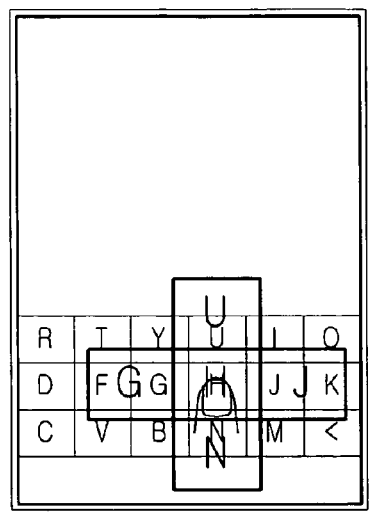
FIGS. 5A and 5B illustrate views showing an example of key display in a space input mode during the key input operation of a portable apparatus according to an embodiment of the present invention.
Figure 5B:
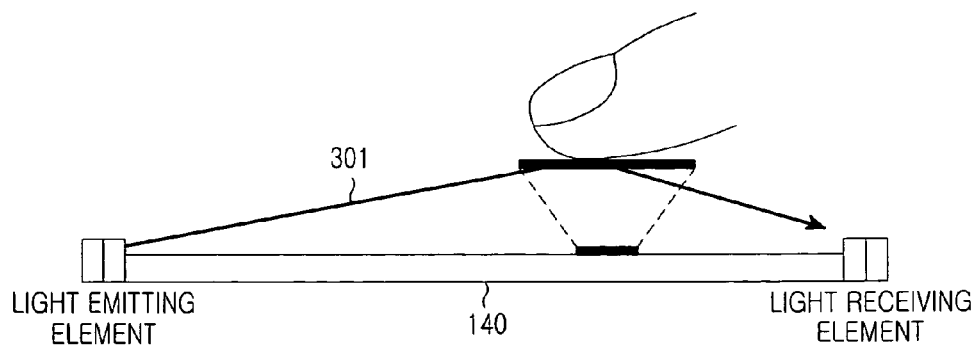

FIGS. 5A and 5B are views showing an example of key display in a space input mode during the key input operation of a portable apparatus according to an embodiment of the present invention. As shown in FIG. 5B, if the space input is generated by the user, the input detection unit 110 detects the position of a key space-input by the user by grasping the light receiving elements that have received the first light signals 301 from the right side and the lower side of the display unit 140. Then, as illustrated in FIG. 5A, the detected key is enlarged and displayed. In this embodiment of the present invention, a three-dimensional user interface is used, and the input key, which corresponds to the detected input key position, and neighboring keys are partially enlarged and displayed as a three-dimensional image. The example of the display operation as described above with reference to FIGS. 6A and 6B may be performed in the same manner in other embodiments of the present invention.

Figure 6A:
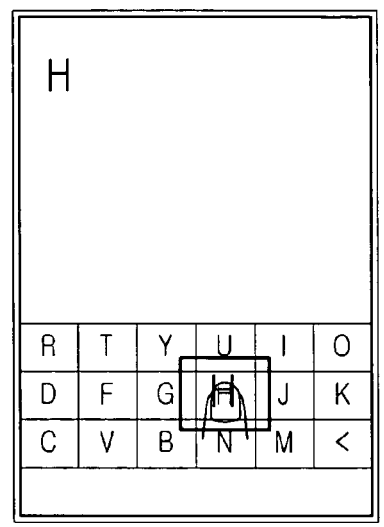
FIGS. 6A and 6B illustrate views showing an example of key display in a touch input mode during the key input operation of a portable apparatus according to an embodiment of the present invention.
Figure 6B:
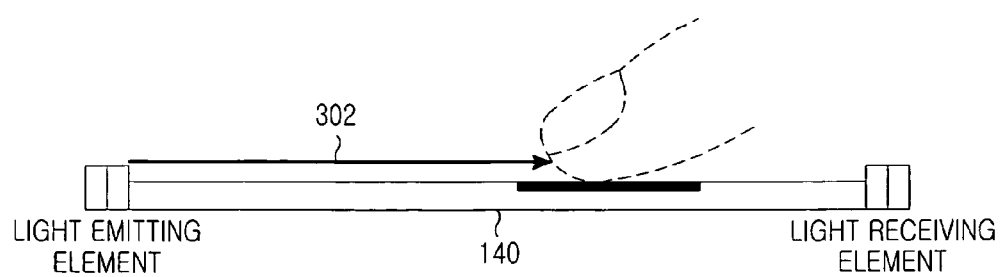

FIGS. 6A and 6B are views showing an example of key display in a touch input mode during the key input operation of a portable apparatus according to an embodiment of the present invention. As shown in FIG. 6B, if the touch input is generated by the user, the input detection unit 110 detects the position of a key touch-input by the user by grasping the light receiving elements that have not received the second light signals 302 from the right side and the lower side of the display unit 140. Then, as illustrated in FIG. 6A, the detected key is enlarged and displayed. In this embodiment of the present invention, a three-dimensional user interface is used, and the input key, which corresponds to the detected input key position, is partially enlarged and displayed as a three-dimensional image. Then, the detected key value is input. Alternatively, in another embodiment of the present invention, the touch input generated in the display unit is detected using the touch screen, and as shown in FIG. 6A, the detected key is enlarged and displayed.

Figure 7:
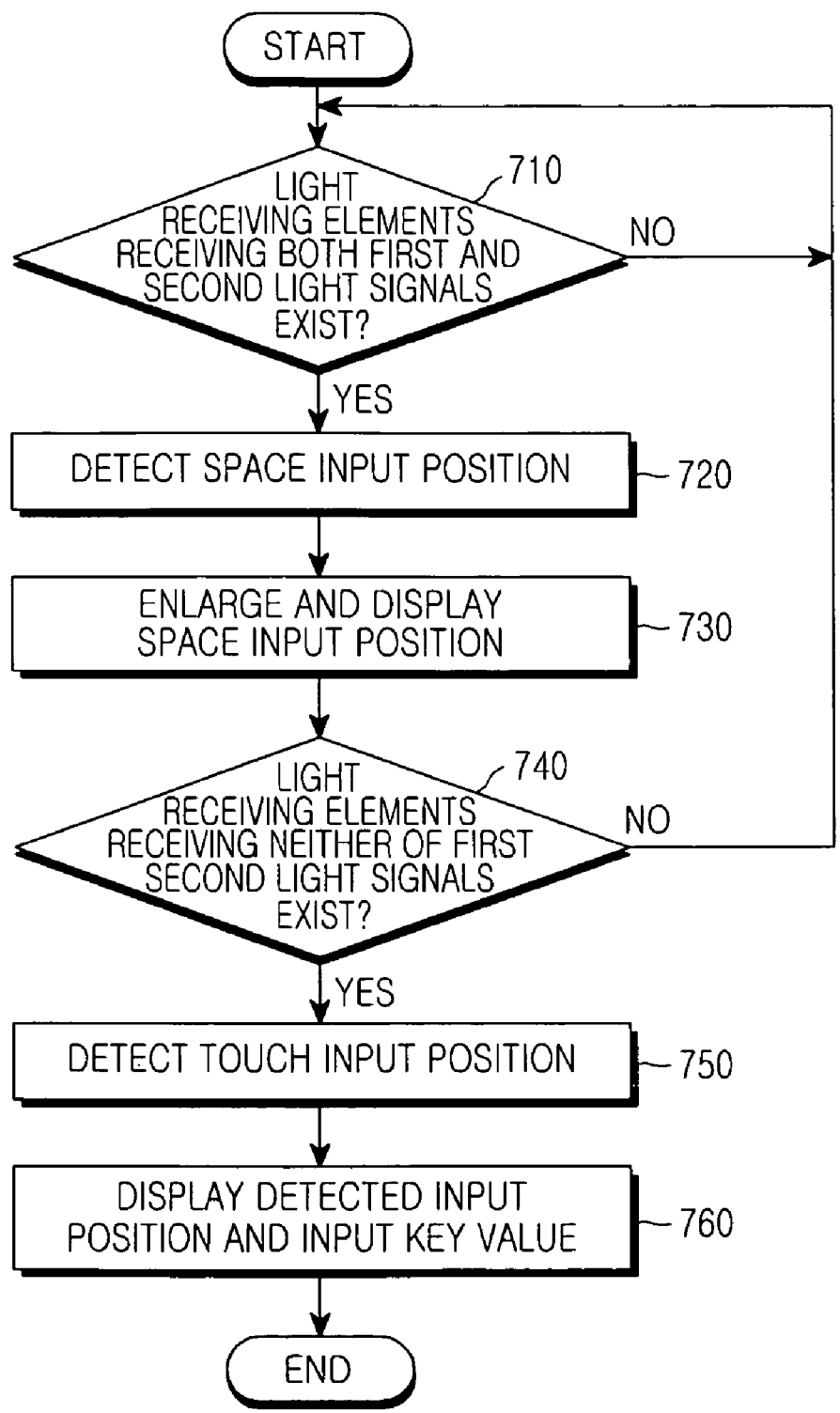
FIG. 7 illustrates a key input method for a portable apparatus according to an embodiment of the present invention.

FIG. 7 illustrates a key input method for a portable apparatus according to an embodiment of the present invention.

Referring to FIG. 7, the input detection unit 150 judges whether the light receiving elements that receive both the first light signals and the second light signals exist in step 710.

If there is no light receiving element that receives both the first light signals and the second light signals in step 710, the input detection unit 150 is in a standby state for user input in step 710, while if the light receiving elements that receive both the first light signals and the second light signals exist in step 710, the input detection unit 150 detects the position of the user's space input by grasping the light receiving elements that receive both the first light signals and the second light signals in step 720. Then, the input detection unit 150 enlarges and displays through the display unit 140 the key corresponding to the detected space input position and neighboring keys in step 730.

Then, the input detection unit 150 judges whether the light receiving elements that do not receive both the first light signals and the second light signals exist in step 740. If the light receiving elements that do not receive both the first light signals and the second light signals exist as a result of judgment in step 740, the input detection unit 150 goes to step 710, while if the light receiving elements that do not receive both the first light signals and the second light signals do not exist as a result of judgment in step 740, the input detection unit 150 goes to step 750, and detects the user's touch input position by grasping the light receiving elements that do not receive both the first light signals and the second light signals. Then, the input detection unit goes to step 760, enlarges and displays the detected touch input key on the display unit 140, and the control unit 110 inputs the detected touch input key value.

In the case in which the display unit 140 is a 3D stereoscopic display, the touch input key detected in steps 730 and 760 can be enlarged and displayed in 3D by projecting the touch input key onto the existing display screen.

FIG. 7 shows an operational flow in an embodiment of the present invention. In another embodiment of the present invention, it is judged whether the light receiving elements that receive the first light signals exist in step 710, and it is judged whether the user's touch input is generated using the touch screen in step 740 to perform the key input operation.

Figure 8:
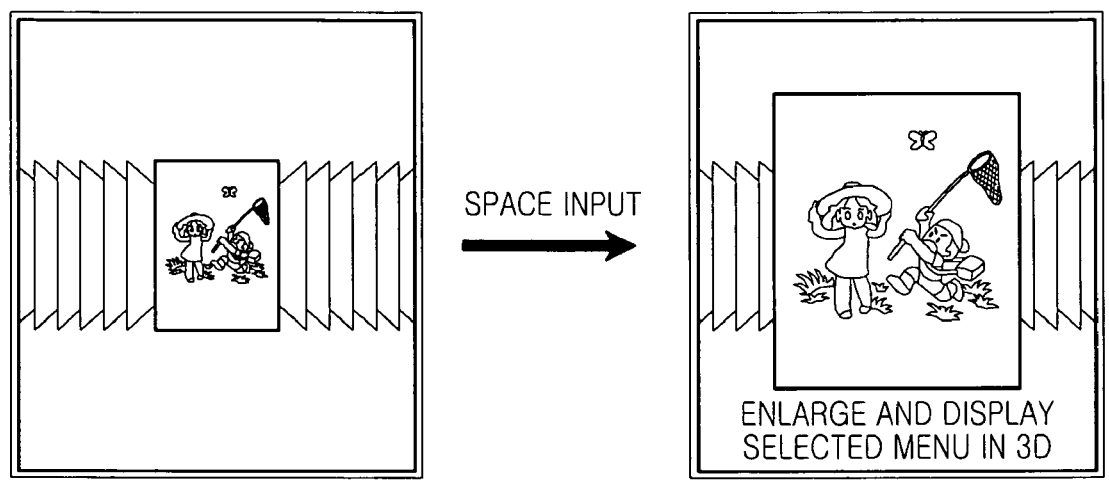
FIG. 8 illustrates an example view showing a menu selection operation using a space input detection method using a light sensor according to an embodiment of the present invention.

FIG. 8 illustrates an exemplary view showing a menu selection operation using a space input detection method using a light sensor according to an embodiment of the present invention. As shown in FIG. 8, the space input detection method according to an embodiment of the present invention may be used in a menu screen, such as a menu selection screen, a menu shift screen, or the like. In this case, if the user's finger approaches, the space input is detected, and the selected menu is enlarged and displayed.

Also, a page turnover operation, a list shift operation, or the like, can be performed only by moving a finger in a space over the display unit without touching the screen. Also, such space input information in cursor movement may be used in diverse applications, such as games, web surfing, and the like.

As described above, according to the present invention, a key input method for providing a convenient user interface can be provided using a light sensor and a touch screen in a portable apparatus. Also, since a visually clean and intuitive key input operation can be performed using the 3D stereoscopic display, the space recognition using the light sensor can be applied to the menu shift, content selection, and the like, and thus a more convenient user interface environment can be established.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A key input apparatus for a portable apparatus, comprising:
a display unit configured to display a key selected by a user input;
a light sensor comprising:
a plurality of light emitting elements disposed at predetermined intervals on a border of a first side of the display unit, and
a plurality of light receiving elements disposed on a border of a second side of the display unit to face the light emitting elements, wherein the light emitting elements are configured to generate first light signals at a predetermined angle from a direction in which the light emitting elements face the light receiving elements and wherein the light sensor is configured to output light signal information of at least one of the light emitting elements and the light receiving elements; and
an input detection unit configured to:
receive the light signal information from the light sensor,
detect at least one of the light receiving elements that receive the first light signals using the light signal information, and
detect a user's space input position using the at least one of the light receiving elements that receive the first light signals if the at least one of the light receiving elements that receive the first light signals are detected.

2. The key input apparatus as claimed in claim 1, wherein a first plurality of the light emitting elements are mounted at predetermined intervals on an upper side of the display unit, and a first plurality of the light receiving elements are mounted on a lower side of the display unit in a position corresponding to the light emitting elements; and
a second plurality of the light emitting elements are mounted at predetermined intervals on a left side of the display unit, and a second plurality of the light receiving elements are mounted on a right side of the display unit in a position corresponding to the light emitting elements.

3. The key input apparatus as claimed in claim 1, wherein the light signal information includes information about whether respective ones of the light receiving elements have received the light signals, and further includes at least one of:
information about quantities of light transmitted from the respective light emitting elements and quantities of light received in the respective light receiving elements; and
information about a change from the transmitted quantities of light to the received quantities of light.

4. The key input apparatus as claimed in claim 1, wherein the light emitting elements are further configured to generate second light signals toward the light receiving elements along surfaces of the display unit.

5. The key input apparatus as claimed in claim 4, wherein the input detection unit is configured to judge whether ones of the light receiving elements that receive both the first light signals and the second light signals exist, and detect the user's space input using the light receiving elements that receive both the first light signals and the second light signals.

6. The key input apparatus as claimed in claim 5, wherein the display unit is configured to enlarge and display a detected key value when the input detection unit detects the user's space input.

7. The key input apparatus as claimed in claim 6, wherein the display unit is configured to display keys neighboring the detected key value when enlarging and displaying the detected key value.

8. The key input apparatus as claimed in claim 4, wherein the input detection unit is configured to judge whether ones of the light receiving elements that do not receive both the first light signals and the second light signals exist, and detect a user's touch input by detecting the ones of the light receiving elements that do not receive both the first light signals and the second light signals.

9. The key input apparatus as claimed in claim 1, wherein the display unit comprises a three-dimensional stereoscopic display, and is configured to enlarge and display the key selected by a user as a three-dimensional image.

10. A key input method for a portable apparatus, comprising:
generating first light signals upward at a predetermined angle from a direction in which a plurality of light emitting elements face a plurality of light receiving elements;
detecting at least one of the light receiving elements that receives the first light signals; and
if the at least one of the light receiving elements that receives the first light signals are detected, detecting a user's space input position using the light receiving elements that receive the first light signals.

11. The method as claimed in claim 10, further comprising displaying a key value corresponding to the detected space input position.

12. The method as claimed in claim 10, wherein displaying the key value comprises enlarging and stereoscopically displaying the key value as a three-dimensional image by the display unit.

13. The method as claimed in claim 10, further comprising:
generating second light signals to a corresponding set of light receiving elements along surface of the display unit by the light emitting elements;
detecting respective ones of the light receiving elements that do not receive the second light signals; and
if the respective ones of the light receiving elements that do not receive the second light signals are detected, detecting a user's touch input position using the respective ones of the light receiving elements that do not receive the second light signals.

14. The method as claimed in claim 10, further comprising detecting the user's touch input position using a touch screen.

15. A portable device comprising:
a display unit configured to display a key selected by a user input;
a light sensor comprising a plurality of light emitting elements and a plurality of light receiving elements disposed at intervals along a border of the display unit, wherein the light emitting elements are configured to generate first light signals at a predetermined angle from a direction in which the light emitting elements face the light receiving elements and wherein the light sensor is configured to output light signal information regarding the first light signals;
an input detection unit configured to detect the user input based on the light signal information.

16. The portable device as claimed in claim 15, wherein the plurality of light emitting elements are disposed at intervals along a border of a first side of the display unit and the plurality of light receiving elements are disposed on a border of a second side of the display unit to face the light emitting elements, and wherein the input detection unit configured to detect at least one of the light receiving elements that receives the first light signals using the light signal information, and detect a user's space input position using the at least one of the light receiving elements that receive the first light signals if the at least one of the light receiving elements that receive the first light signals are detected.

17. The portable device as claimed in claim 16, wherein a first plurality of the light emitting elements are disposed at predetermined intervals on an upper side of the display unit, and a first plurality of the light receiving elements are disposed on a lower side of the display unit in a position corresponding to the light emitting elements; and
a second plurality of the light emitting elements are disposed at predetermined intervals on a left side of the display unit, and a second plurality of the light receiving elements are disposed on a right side of the display unit in a position corresponding to the light emitting elements.

18. The portable device as claimed in claim 16, wherein the light signal information includes information about whether respective ones of the light receiving elements have received the light signals, and further includes at least one of:
information about quantities of light transmitted from the respective light emitting elements and quantities of light received in the respective light receiving elements; and
information about a change from the transmitted quantities of light to the received quantities of light.

19. The portable device as claimed in claim 16, wherein the light emitting elements are further configured to generate second light signals toward the light receiving elements along surfaces of the display unit.

20. The portable device as claimed in claim 15, wherein the display unit comprises a three-dimensional stereoscopic display, and is configured to enlarge and display the key selected by a user as a three-dimensional image.

* * * * *